(12) United States Patent
Varnham et al.

(10) Patent No.: US 7,502,391 B2
(45) Date of Patent: Mar. 10, 2009

(54) EYE SAFE HIGH POWER FIBRE LASER

(75) Inventors: Malcolm Paul Varnham, Alresford (GB); Mikhail Nicholaos Zervas, Southampton (GB); David Neil Payne, Southampton (GB); Lars Johan Albinsson Nilsson, Southampton (GB)

(73) Assignee: SPI Lasers UK Limited, Southampton (GB)

(*) Notice: Subject to any disclaimer, the term of this patent is extended or adjusted under 35 U.S.C. 154(b) by 360 days.

(21) Appl. No.: 10/566,222

(22) PCT Filed: Jul. 28, 2004

(86) PCT No.: PCT/GB2004/003265

§ 371 (c)(1),
(2), (4) Date: Jan. 27, 2006

(87) PCT Pub. No.: WO2005/013444

PCT Pub. Date: Feb. 10, 2005

(65) Prior Publication Data

US 2006/0187973 A1    Aug. 24, 2006

(30) Foreign Application Priority Data

Jul. 28, 2003 (GB) .................................. 0317604.7
Mar. 2, 2004 (GB) .................................. 0404594.4
Mar. 26, 2004 (GB) .................................. 0406765.8

(51) Int. Cl.
*H01S 3/30* (2006.01)
*H01S 3/10* (2006.01)
*H01S 3/14* (2006.01)

(52) U.S. Cl. .................................. 372/6; 372/26; 372/68
(58) Field of Classification Search .................... 372/6, 372/26, 68
See application file for complete search history.

(56) References Cited

U.S. PATENT DOCUMENTS

| 5,530,710 | A  | * | 6/1996 | Grubb | .......................... 372/6 |
| 6,031,850 | A  |   | 2/2000 | Cheo |  |
| 6,340,806 | B1 |   | 1/2002 | Svetkoff |  |
| 6,411,323 | B1 | * | 6/2002 | Waarts et al. | .............. 347/241 |
| 6,445,494 | B1 |   | 9/2002 | Paschotta |  |
| 6,751,241 | B2 | * | 6/2004 | Davis et al. | ..................... 372/6 |
| 2003/0035628 | A1 |   | 2/2003 | Kersey et al. |  |

FOREIGN PATENT DOCUMENTS

| EP | 1 113 540 A | 7/2001 |
| WO | WO 02-37625 | 5/2002 |

* cited by examiner

*Primary Examiner*—Minsun Harvey
*Assistant Examiner*—Marcia A. Golub
(74) *Attorney, Agent, or Firm*—John S. Reid (57) ABSTRACT

Apparatus for providing optical radiation includes a pump source and at least one first amplifying waveguide. The first amplifying waveguide emits optical radiation in excess of 1400 nm when pumped by the pump source. In one embodiment, the pump source can include a plurality of laser diodes and a plurality of second amplifying waveguides. In this arrangement the first amplifying waveguide is pumped by the second amplifying waveguides, the second amplifying waveguides are pumped by the laser diodes, and the second amplifying waveguides are configured to improve the beam quality of radiation emitted by the laser diodes.

28 Claims, 4 Drawing Sheets

EYE SAFE HIGH POWER FIBRE LASER

CROSS REFERENCE TO RELATED APPLICATIONS

The present application is a U.S. National Stage filing of Patent Cooperation Treaty ("PCT") application serial number PCT/GB2004/003265, filed 28 Jul. 2004, which in turn claims priority to United Kingdom (Great Britain) Patent Application Serial Numbers GB 0317604.7, filed 28 Jul. 2003, GB 0404594.4, filed 2 Mar. 2004, and GB 0406765.8, filed 26 Mar. 2004, all of which are incorporated by reference herein in their entirety.

FIELD OF INVENTION

This invention relates to an apparatus for providing optical radiation. The invention has particular relevance for welding, drilling and cutting applications using lasers in factory environments in which light scatter from ceilings and other surfaces represents a safety hazard, and for low heat generation in high-power fibre lasers.

BACKGROUND TO THE INVENTION

Fibre lasers are increasingly being used for material processing applications such as welding, cutting and marking. Their advantages include high efficiency, robustness and high beam quality. Examples include femtosecond lasers for multiphoton processing such as the imaging of biological tissues, Q-switched lasers for machining applications, and high-power continuous-wave lasers.

Traditional lasers used for material processing applications predominate at around 1.06 μm and longer wavelengths such as provided by a carbon dioxide laser (10.6 μm). These lasers are being supplemented by fibre lasers operating at around 1.06 μm. Light scattered from the work piece when using such fibre lasers is a problem because the scatter is at wavelengths at which the retina of the eye can be easily damaged.

It is desirable to have eye safe wavelengths for scatter light considerations. This means wavelengths longer than 1400 nm, and preferably between 1500 nm and 2500 nm. Erbium is a suitable dopant for fibre lasers outputting in the 1550 nm wavelength window. Erbium doped fibres can be pumped at a variety of wavelengths, including by high-power diode lasers operating between 915 nm and 980 nm. Unfortunately, the erbium doped fibre is not very efficient when pumped at 915 nm and this leads to undesirable heat generation within the erbium doped fibre.

It is also desirable to improve the thermal management of fibre lasers so as to reduce the problem of heat generation within a high power fibre laser. The main source of heat generation is due to the quantum defect (ie the difference in photon energy between the pump and the laser photons).

It is also preferable to use an optical fibre material that has good heat resistance, low loss properties, and that can be fusion spliced.

Laser diodes have reduced life if they are pulsed and this therefore limits the life of high power fibre lasers that are pumped by pulsed laser diodes. A solution is to accept diode failures and to provide redundancy. Commercial systems available today can use between 10% and 20% more laser diodes than would otherwise be required if the laser diodes were more reliable. It would be an advantage to improve the reliability of pulsed fibre lasers that are pumped by laser diodes.

An aim of the present invention is to provide an apparatus for providing optical radiation that reduces at least one of the above aforementioned problems.

SUMMARY OF THE INVENTION

According to a non-limiting embodiment of the present invention, there is provided apparatus for providing optical radiation comprising a pump source and at least one first amplifying waveguide, CHARACTERISED IN THAT the first amplifying waveguide emits optical radiation in excess of 1400 nm when pumped by the pump source.

The pump source may include a plurality of laser diodes and at least one second amplifying waveguide, wherein the first amplifying waveguide is pumped by the second amplifying waveguide, and the second amplifying waveguide is pumped by the laser diodes, the apparatus being characterised in that the second amplifying waveguide is configured to improve the beam quality of radiation emitted by the laser diodes. The beam quality of the radiation emitted by the laser diodes can be measured in terms of its beam parameter product (here defined as half divergence angle, half focussed spot radius). The product of the numerical aperture and $1/e^2$ guided beam radius (approximately the core radius for a waveguide having a core) of the second amplifying waveguide should be less than the beam parameter product of the radiation supplied from the laser diodes.

The pump source may include at least one multimode beam combiner for combining optical radiation emitted by the laser diodes.

The apparatus may include at least one first beam combiner for combining optical radiation emitted by the second amplifying waveguides.

The first amplifying waveguide may comprise a first optical fibre.

The first optical fibre may comprise a region containing a first rare-earth dopant. The first rare earth dopant may be selected from the group comprising erbium, holmium and thulium. The first rare earth dopant may be co-doped with ytterbium. The apparatus may be such that the first rare-earth dopant is pumped substantially at the peak of its absorption band.

The first optical fibre may comprise a core and a cladding. The first optical fibre may be single mode or multi mode. The first optical fibre may comprise a plurality of cores.

The second amplifying waveguide may comprise a second optical fibre. The second optical fibre may comprise a region containing a second rare-earth dopant. The second optical fibre may comprise a core and a cladding. The second optical fibre may comprise a grating written into at least one of the core and the cladding. The second optical fibre may be single mode or multi mode. The second optical fibre may comprise a plurality of cores.

The apparatus may include means to change the wavelength of radiation emitted by the second amplifying waveguide. The means may be a wavelength tuneable reflector, an optical switch, a source of optical radiation, or a tuneable grating. The tuneable grating may be thermally tuned, or tuned by an actuator.

The apparatus may be configured such that the optical radiation emitted by the first amplifying waveguide has a higher brightness when the second amplifying optical fibre emits at a first wavelength. This is a particularly advantageous implementation of the invention in that it is useful for modulating high-power fibre lasers that are pumped by a plurality of laser diodes. By high power, it is meant a fibre laser that emits greater than 10 W or optical radiation, and preferably greater than 100 W. The invention is particularly advantageous for high power fibre lasers that emit between 1 kW and 10 kW of optical radiation. Instead of switching the laser diodes on and off, the fibre laser can be controlled with a lower power signal. Advantages include increasing the life of the laser diodes, and removing the need for switching electrical power. Additionally, as will be described herein, the present invention allows distributed thermal management and shorter, more powerful lasers—particularly at so-called "eye-safe" wavelengths.

The apparatus may be such that the pump source supplies pump radiation for in-band pumping the first amplifying waveguide. The pump wavelength and the wavelength of the optical radiation may both be between 1400 nm and 2500 nm.

The pump source may comprise a broad stripe laser diode.

The optical radiation may be coupled to a scanner. The apparatus may include a controller for synchronizing the optical radiation with the scanner.

The apparatus may be in the form of an amplifier, a laser, a master oscillator power amplifier, a Q-switched laser, a source of amplified spontaneous emission, or a continuous wave laser.

The apparatus may be in the form of a laser for material processing.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figure 1:
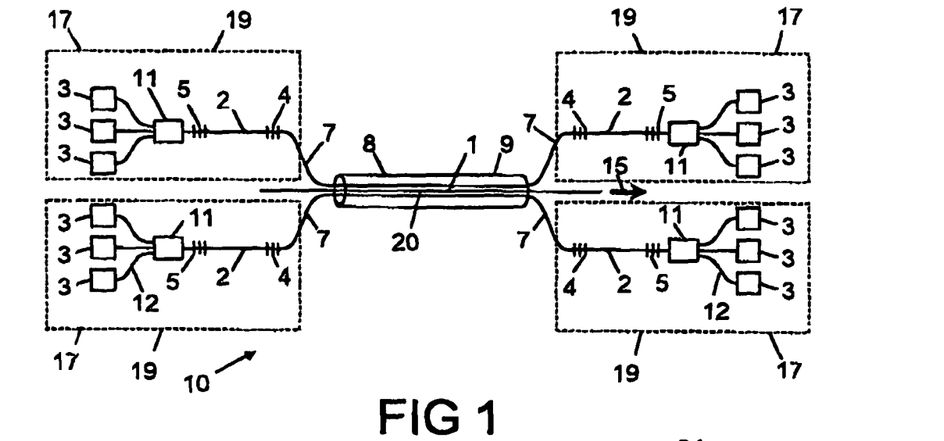
FIG. 1 shows an apparatus for providing optical radiation according to the present invention.

With reference to FIG. 1, there is shown apparatus 10 for providing optical radiation 15 comprising a pump source 19 and at least one first amplifying waveguide 1, characterised in that the first amplifying waveguide 1 emits optical radiation 15 in excess of 1400 nm when pumped by the pump source 19.

FIG. 1 shows the pump source 19 comprising a plurality of laser diodes 3 and a plurality of second amplifying waveguides 2. The first amplifying waveguide 1 is pumped by the second amplifying waveguides 2. The second amplifying waveguides 2 are pumped by the laser diodes 3. The second amplifying waveguides 2 are configured to improve the beam quality of radiation emitted by the laser diodes 3. The beam quality of the radiation emitted by the laser diodes 3 can be measured in terms of its beam parameter product (here defined as half divergence angle, half focussed spot radius). The product of the numerical aperture and $1/e^2$ guided beam radius (approximately the core radius for a waveguide having a core) of the second amplifying waveguide 2 should be less than the beam parameter product of the radiation supplied from the laser diodes 3.

Figure 2:
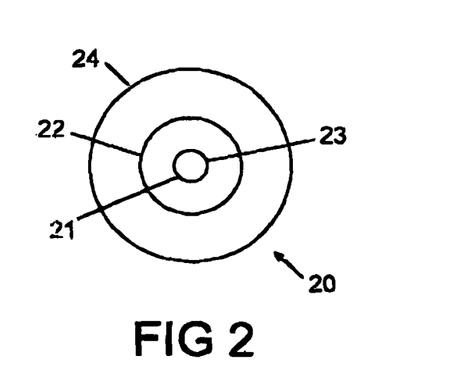
FIGS. 2 and 3 show cladding pumped optical fibres.

The first amplifying waveguide 1 is preferably a cladding pumped optical fibre such as the first amplifying fibre 20 shown in FIG. 2. The first amplifying fibre 20 comprises a first core 21 and a first cladding 22, and first rare earth dopant 23 in at least one of the first core 21 and the first cladding 22. Also shown is a coating 24 which may be a glass or a polymer. The refractive index of the coating 24 is preferably less than the refractive index of the first cladding 22.

Figure 3:
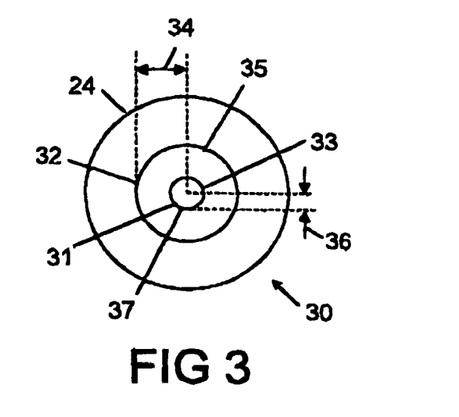

The second amplifying waveguide 2 is preferably a cladding pumped optical fibre such as the second amplifying fibre 30 shown in FIG. 3. The second amplifying fibre 30 comprises a second core 31 and a second cladding 32, and second rare earth dopant 33 in at least one of the second core 31 and the second cladding 32. For circular fibres, the product of the radius 34 of the second cladding 32 and the numerical aperture 35 derived from the refractive index difference between the second cladding 32 and the coating 24 should be greater than the beam parameter product of the radiation supplied to the second amplifying fibre 30 from the laser diodes 3. This is to ensure that the second amplifying fibre 30 can guide the pump radiation efficiently. The product of the radius 36 of the second core 31 and the numerical aperture 37 derived from the refractive index difference between the second core 31 and the second cladding 32 should be greater than the beam parameter product of the radiation supplied to the second amplifying fibre 30 from the laser diodes 3. This is to increase the brightness of the pump radiation that will be supplied to the first amplifying waveguide 1 in FIG. 1 from the second amplifying waveguide 2. Modifications to these principles will be required for fibres with non-circular cores and claddings, or to fibres which do not have a core, but which guide using longitudinally extending holes (micro-structured fibres).

The first and second claddings 22, 32 can be circular or non-circular. The first and second claddings 22, 32 can contain flats machined on their surface in order to form a D-shape. The first and second claddings 22, 32 can be solid or may comprise longitudinally extending holes. Longitudinally extending holes are advantageous for guiding pump radiation without the pump radiation "seeing" the coating 24. This therefore has thermal dissipation advantages in that the coating 24 may be a metal coating, which would otherwise attenuate the pump radiation as it propagates along the cladding. The metal coating may be soldered to a heat sink.

Referring to FIG. 1, the first amplifying waveguide 1 may be part of a fibre 8 that contains the first amplifying waveguide 1 (preferably in the form of the first amplifying fibre 20) and at least one pump fibre 7 surrounded by a common coating 9. The first amplifying waveguide 1 and the pump fibre 7 are in optical contact along at least a portion of their length. This is only one example of a cladding-pumped fibre and that the invention can be used with other forms of cladding-pumped fibres that are described in the literature.

The invention is particularly useful for application in high power fibre lasers emitting optical radiation 15 between 1500 nm and 2500 nm. For example, if the first rare earth dopant 23 is erbium and the pump diodes 3 emit optical radiation at 976 nm, then the conventional solution for pumping the first amplifying fibre 20 would be to combine the optical radiation from the laser diodes 3 and couple the radiation into the first amplifying fibre 20. This approach is limited by the poor beam quality provided by the output of laser diodes. The conventional approach leads to large diameters of the first cladding 21 (for example 500 um to 5 mm) and inefficient absorption of the pump radiation by the first amplifying fibre 20 which leads to undesirable heat generation. The inclusion of the intermediary stage involving the second amplifying fibre 30 permits brightness conversion. Thus the multimoded pump radiation emitted by the diode lasers 3 is converted to pump radiation having a higher beam quality in order to pump the first amplifying fibre 20. Thus for example, the second rare-earth dopant 33 may be erbium codoped with ytterbium, and pump radiation at a wavelength of 910 nm to 980 nm can be used to cladding pump the second amplifying fibre 30 whose second core 31 may be single mode (or multimode or contain a plurality of single mode or multimode cores) and be configured to emit radiation at 1530 nm (or 1460 nm to 1550 nm). This is a convenient wavelength for in-band pumping the first rare earth dopant 23 (in this case erbium). It is then possible to reduce the cross-section of the first cladding 22 to smaller dimensions than would otherwise be possible, resulting in increased absorption and thus shorter fibre length. Advantageously, the invention also provides a method of distributing the thermal dissipation in several stages. This is particularly advantageous for providing high power (100 W to 10 kW) optical radiation 15 in the eye safe 1500 to 1650 wavelength window as the efficiency of cladding pumped erbium doped amplifiers can be relatively low (eg 25% to 30%) if pumped from 915 nm. The advantages combine to give an apparatus that is very advantageous for material processing applications where the control of thermal dissipation near the work piece and the eye safe wavelengths provide excellent safety advantages over existing systems.

Referring to FIG. 1, the apparatus 10 may include first reflectors 4 and second reflectors 5 in order to form a laser cavity in the second amplifying waveguide 2. The first and second reflectors 4, 5 may be mirrors, reflectors, gratings, or fibre Bragg gratings. If the second rare-earth dopant 33 is erbium codoped with ytterbium, then it is advantageous to separate out the photosensitive region (typically doped with germinia) which is used to form the fibre Bragg grating from the region doped with the second rare-earth dopant 33 (which would require phosphorus co-dbping). The second amplifying waveguide 2 may comprise a single core 31 which may be single moded or multi moded. Alternatively, the second amplifying waveguide 2 may comprise a plurality of cores 31 which may be single moded or multi moded. A fibre amplifying optical fibre comprising multiple single mode cores is advantageous because it facilitates the writing of single-mode or multi-mode fibre Bragg gratings in each of the cores. Multiple cores containing fibre Bragg gratings offer a route towards high efficiency and shorter fibre lengths. Writing of the single mode fibre Bragg gratings is further facilitated by arranging the cores 21 linearly across the fibre's cross-section. The cores 21 can be spaced sufficiently far apart so as not to cause interference effects.

Also shown in FIG. 1 are first beam combiners 11 which combine the pump radiation from the laser diodes 3. The first beam combiners 11 can be multi-mode beam combiners that can incorporate tapers in order to couple from an input fibre 12 to the second amplifying waveguide 2 (preferably in the form of the second amplifying fibre 30). Beam combiners are available which can couple the power from three, seven, nineteen or higher numbers of fibres. Alternatively, the first beam combiners 11 can comprise lenses, splices between fibres of different diameters, or etched fibre sections.

The pumps 3, first beam combiner 11, second amplifying fibre 30, and first and second reflectors 4, 5 comprise a first fibre pump module 17 as shown in FIG. 1.

Figure 4:
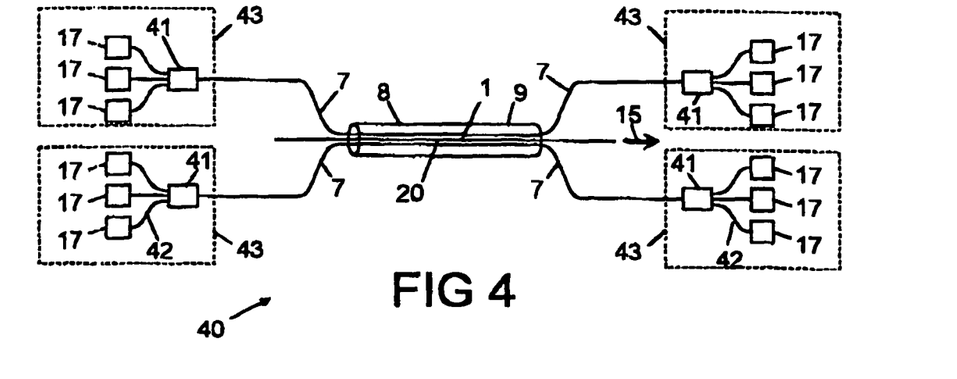
FIG. 4 shows apparatus comprising a plurality of first fibre pump modules.

FIG. 4 shows apparatus 40 comprising second fibre pump modules 43 which comprise a plurality of the first fibre pump modules 17 whose outputs are combined in a second beam combiner 41. The second fibre pump modules 43 are used to pump the first amplifying waveguide 1 (preferably in the form of the first amplifying fibre 20). The second beam combiners 41 may combine the outputs of between 2 and 64 first fibre pump modules 17, with 3, 7, and 19 being preferred numbers.

The pump diodes 3 may be single emitters which are currently available at power levels of 5 W to 10 W. If the first and second beam combiners 11, 41 each combine 19 inputs, then continuous wave output power levels up to 3.6 kW multiplied by the efficiency of the second amplifying fibre 30 are achievable. Assuming 25% efficiency (for erbium pumped at 915 nm and emitting at 1532 nm), the first amplifying fibre 20 shown in FIG. 4 can be pumped by up to 4 kW of pump energy with the majority of the wasted energy being dissipated in the first fibre pump modules 17. The invention thus provides a method of achieving eye-safe laser radiation at high powers with the benefit of distributing the thermal heat load to avoid concentrating inefficiencies in the final stage. It is also believed that such a double pumping arrangement is more efficient than using 1480 nm pump diodes to pump the first amplifying waveguide 1 directly. This efficiency advantage may be overcome if 1480 to 1550 pump diodes can be made more efficient.

Figure 5:
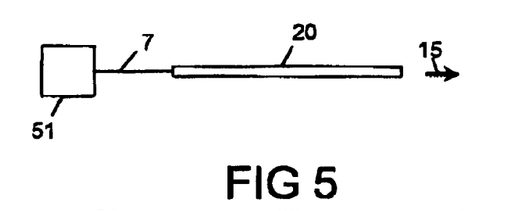
FIG. 5 shows apparatus which is end pumped.

FIG. 5 shows apparatus in which a pump source 51 pumps the first amplifying fibre 20 in an end-pumped configuration. The pump source 51 can be the first or second fibre pump source 17, 43.

Figure 6:
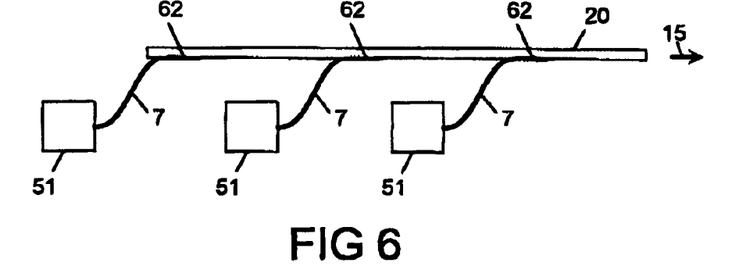
FIG. 6 shows apparatus containing a plurality of second fibre pump modules.

FIG. 6 shows apparatus comprising a plurality of the fibre pump sources 51 coupled into the first amplifying fibre 20 by side couplers 62. The side couplers can take many forms known in the art for cladding pumping fibre amplifiers and lasers including the fibre arrangement 9 shown in FIGS. 1 and 4.

Figure 7:
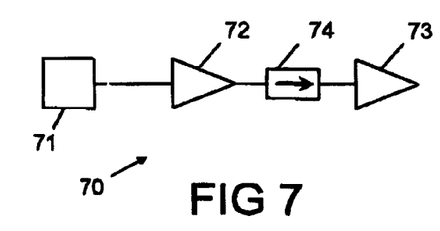
FIG. 7 shows apparatus in the form of a master oscillator power amplifier.

FIG. 7 shows apparatus in the form of a master oscillator power amplifier (MOPA) 70 comprising a seed source 71 and first and second amplifiers 72, 73. Also shown is an optional optical isolator 74 for preventing undesirable feedback into the first amplifier 72. The first amplifier 72 can be a conventional optical amplifier, the apparatus 10 shown in FIG. 1, the apparatus 40 shown in FIG. 4, or apparatus described with reference to FIGS. 10 and 11. The first and second amplifiers 72, 73 may comprise cascaded gain media. The second amplifier 73 can be the apparatus 10 shown in FIG. 1, the apparatus 40 of FIG. 4, or apparatus described with reference to FIGS. 10 and 11. The seed source 71 can be a laser diode, a fibre laser, a Q-switched laser, a gas laser, or a solid-state laser. The seed source 71 is selected such that the first amplifying waveguides 1 in the first and second amplifiers 72, 73 provide amplification when pumped by the pump diodes 3.

Figure 8:
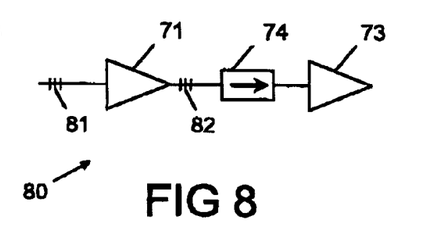
FIG. 8 shows apparatus in the form of a continuous wave laser.

FIG. 8 shows apparatus in the form of a continuous wave laser 80 comprising the first and second amplifiers 72, 73, and first and second reflectors 81, 82. The first and second reflectors 81, 82 can be mirrors, reflectors, gratings, or fibre Bragg gratings.

Figure 9:
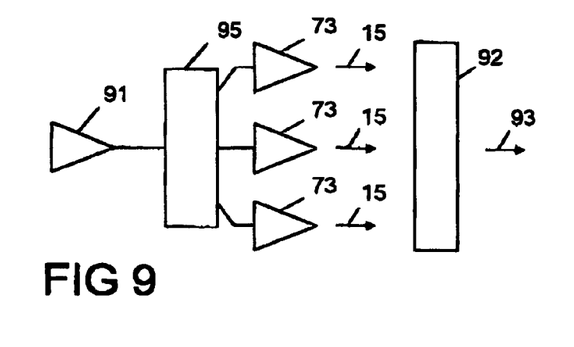
FIG. 9 shows apparatus comprising a plurality of second amplifiers.

FIG. 9 shows apparatus that comprises a plurality of second amplifiers 73 driven from a common seed source 91 via beam splitter 95. The beam splitter 95 can comprise optical fibre couplers. The seed source 91 can be a laser, a laser diode, a fibre source, or a fibre laser. The output radiation 15 of the second amplifiers 73 can be combined together in the beam combiner 92 to provide the output 93. The beam combiner can utilize coherent beam combining or incoherent beam combining. The beam combiner 92 may comprise a plurality of lenses, mirrors and/or prisms.

Although the description pertaining to eye safety and the selection of the first rare earth dopant 23 concentrate on erbium, the first rare earth dopant 23 may be selected from the group comprising erbium, holmium and thulium. The rare earth dopant 23 may be co-doped with ytterbium. This has been found to be advantageous for erbium ytterbium doping when utilizing in-band pumping even though the ytterbium has no spectroscopic function. The ytterbium appears to increase the efficiency of the erbium, possibly by improving its solubility. Ytterbium codoping also appears to avoid other deleterious effects such as clustering which can give rise to up conversion.

The invention is also useful for other wavelength regimes. Thus the first and second rare earth dopants 23, 33 can be selected from the group erbium, ytterbium, holmium, terbium, and neodymium.

The laser diodes 3 can be broad stripe laser diodes. Alternatively or in addition, at least some of the laser diodes 3 can be diode bars or diode stacks. The first beam combiner 11 can be a lens or a fused taper coupler such as described in U.S. Pat. No. 5,864,644, which is hereby incorporated herein by reference. The pump fibre 7 may be a high numerical aperture multimode optical fibre.

The apparatus 10 is in the form of a source of amplified spontaneous emission or an amplifier. The apparatus 10 can be configured as a laser which may be pulsed, modulated, Q-switched, or continuous wave.

Figure 10:
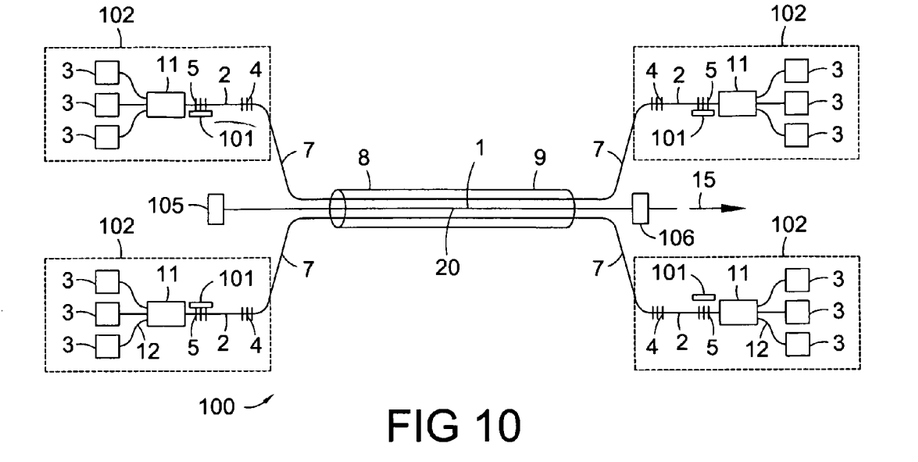
FIG. 10 shows apparatus including an actuator.

FIG. 10 shows apparatus in which the wavelength of radiation emitted by the second amplifying waveguide 2 can be changed by an actuator 101 attached to the second reflector 5 in first fibre pump module 102. The actuator 101 and second reflector 5 combination is a tuneable wavelength reflector which can be a grating that is thermally tuned or tuned by application of stress and/or strain. Thus for example, the second amplifying fibre 30 can be doped with ErYb and emit optical radiation normally at around 1 μm. If the first and second reflectors 4, 5 are selected to reflect in the wavelength range 1460 nm to 1550 nm, then by tuning the reflectivity of at least one of them (by wavelength and/or amplitude) such that both the first and second reflectors 4, 5 reflect at the same wavelength in the range 1460 nm to 1550 nm, the second amplifying fibre 30 can be turned into a laser emitting at 1460 to 1550 nm. If the first amplifying fibre 20 is doped with Er then the erbium can be pumped in a manner that is controllable by the actuator 101. The second amplifying fibre 102 can contain reflectors 105, 106, which may be mirrors, gratings or fibre gratings configured such that apparatus 100 lases when pumped in the wavelength range 1460 nm to 1550 nm. This can be achieved if the reflectors 105, 106 reflect at longer wavelengths, say at 1560 nm.

Figure 11:
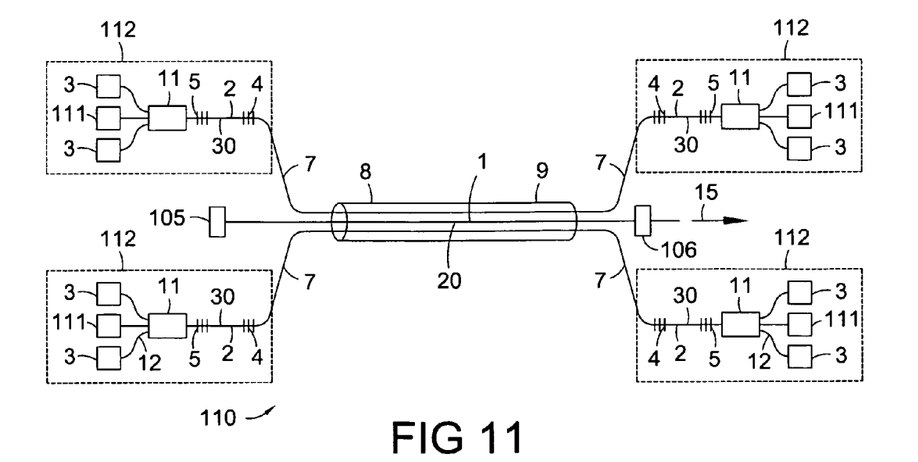
FIG. 11 shows apparatus including a source of optical radiation.

An alternative means for changing the wavelength of radiation emitted by the second amplifying waveguide 2 is shown in FIG. 11. In FIG. 11, a source of radiation 111 is included in each first fibre pump module 112. The source of radiation 111 can be a laser that is controlled by application of a signal. Advantageously, the second amplifying waveguide 2 may contain ErYb dopant and the first fibre pump module 112 may be configured by first and second reflectors 4, 5 to emit radiation at 1090 nm. Preferably the first and second reflectors 4, 5 would have relatively low reflectivity (0.1% to 10%) in order to clamp the gain. This can be advantageous to prevent spontaneous pulses from damaging the apparatus. Injection of radiation in the wavelength range 1500 nm to 1550 nm by the source of radiation 111 (which may be a laser diode or fibre laser) of sufficient power level will cause the second amplifying fibre 30 to amplify the radiation and thus pump the first amplifying fibre 20 (preferably doped with erbium) in order to emit the desired optical radiation 15. Thus control of the source of radiation 111 can be used to modulate the optical radiation 15 which is beneficial for many high power laser applications because it avoids modulating the laser diodes 3.

Other means for changing the wavelength of radiation emitted by the second amplifying waveguide 2 include a wavelength tuneable reflector and an optical switch.

In general the second amplifying fibre 30 in FIGS. 10 and 11 can be designed such that it can emit optical radiation at a first wavelength λ1 or a second wavelength λ2 in response to a signal (not shown). The first amplifying fibre 20 is then designed such that the optical radiation 15 has a higher brightness when the second amplifying optical fibre 1 emits at the first wavelength λ1 than the second wavelength λ2. This is a particularly advantageous implementation of the invention, useful for modulating high-power fibre lasers that are pumped by a plurality of laser diodes. By high power, it is meant a fibre laser that emits greater than 10 W or optical radiation, and preferably greater than 100 W. The invention is particularly advantageous for high power fibre lasers that emit between 1 kW and 10 kW of optical radiation. Instead of switching the laser diodes on and off, the fibre laser can be controlled with a lower power signal. Advantages include increasing the life of the laser diodes, and removing the need for switching electrical power. Additionally, as described in this specification, the invention allows distributed thermal management and shorter, more powerful lasers—particularly at so-called "eye-safe" wavelengths.

Referring back to FIG. 1, the pump source 19 can be a pump diode or a module comprising a plurality of pump diodes that emit at a pump wavelength □p. The first amplifying waveguide 1 may be the first amplifying fibre 20, and the pump source 19 selected to in-band pump the first rare earth dopant 23. The first rare earth dopant 23 may be erbium. Erbium doped amplifiers as used in telecommunication systems are generally pumped by laser diodes having wavelengths of either 980 nm or 1480 nm. High power amplifiers and lasers containing erbium are generally pumped at 980 nm, or at 915 nm if the fibre is co-doped with ytterbium. However these wavelengths are not ideal for high-power lasers including high-power lasers for material processing applications. In-band pumping erbium means that the pump wavelength λp should be between 1400 nm and 1600 nm.

Preferably the pump wavelength λp should be near the peak absorption of the first rare-earth dopant 23, for erbium this being at around 1530 nm, and certainly within a range of 1525 nm to 1535 nm. In order to minimize heat dissipation in the first amplifying waveguide 1, the optical radiation 15 can have a signal wavelength λs (not shown) close (within 15 nm, but preferably within 5 nm) to the pump wavelength λp. More typically, it is desirable to optimise pump absorption and efficiency, and to achieve this with reasonably low thermal dissipation. Pump absorption is optimised by pumping at the peak of the absorption band of the rare-earth dopant within the glass matrix. Thus for a phosphosilicate core doped with erbium, the pump wavelength λp can be 1530 nm to 1540 nm (preferably 1535 nm) with the signal wavelength λs at a wavelength between 1560 nm and 1650 nm. More generally the pump wavelength λp can be between 1460 nm and 1540 nm, and the signal wavelength λs greater than the pump wavelength λp by more than 25 nm, and preferably by more than 45 nm. Similar design rules will apply to fibres doped with other dopants including rare-earth dopants, although the precise wavelengths will be different. Advantages include efficient pump absorption (which reduces the length of the optical amplifying waveguide 1), reduction in thermal effects within the optical amplifying waveguide 1 by reducing the wavelength difference between pump wavelength $\lambda p$ and signal wavelength $\lambda s$, and that both the pump wavelength $\lambda p$ and the signal wavelength $\lambda s$ can be configured at eye safe wavelengths. The advantages combine to give an apparatus 10 that is very suited for materials processing applications where the control of thermal dissipation near the work piece and the eye safe wavelengths provide excellent safety advantages over existing systems.

Although the above description concentrates on erbium, the first rare earth dopant 23 may be selected from the group comprising erbium, holmium and thulium. By appropriate selection of these rare earth dopants, it is possible to set the pump and signal wavelengths within the range 1400 nm to 2500 nm. This feature is advantageous for eye safety, especially in the event of a fibre break in a factory environment.

Figure 12:
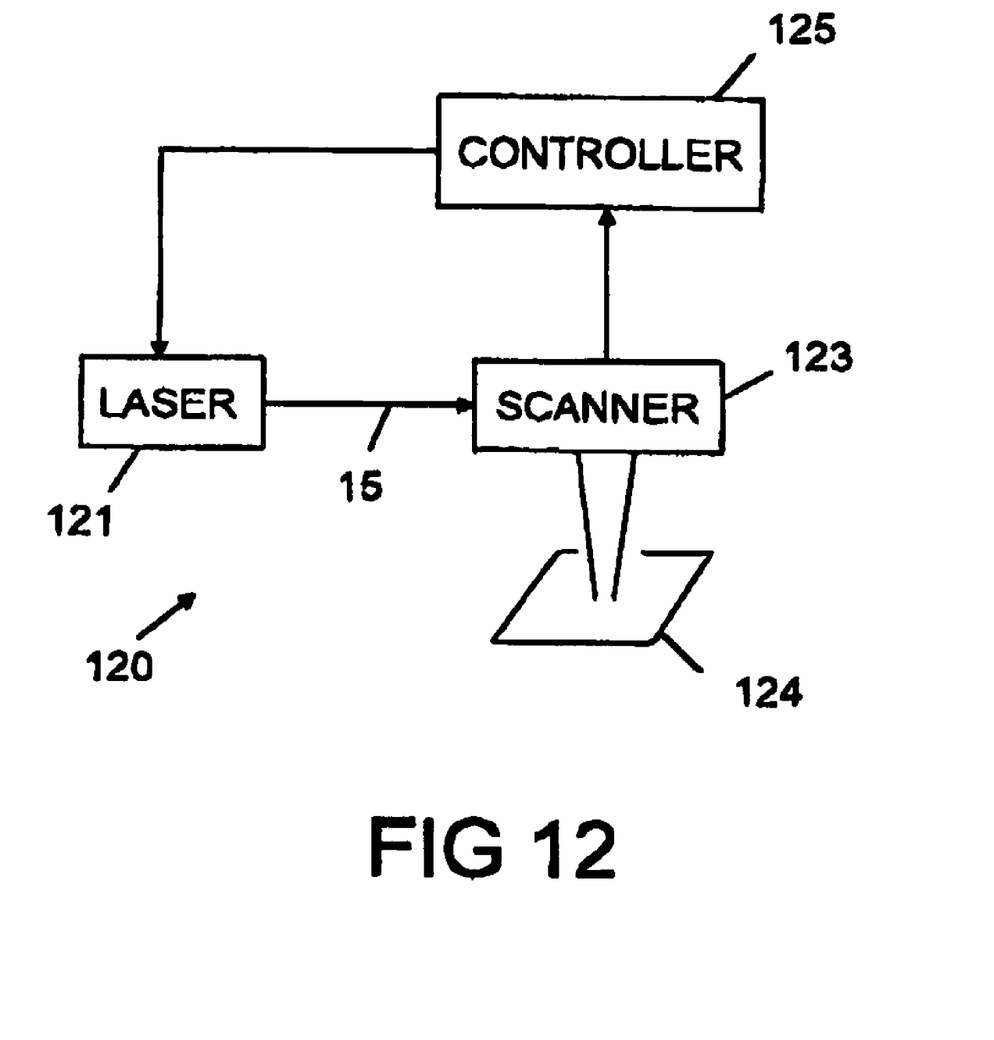
FIG. 12 shows apparatus in the form of a laser for material processing.

FIG. 12 shows apparatus in the form of a laser 120 for materials processing 120, which apparatus comprises a laser 121 emitting optical radiation 15 which is coupled to a scanner 123. The laser 121 can be the laser shown in FIGS. 5 to 11. The laser 121 can comprise the double pumping arrangements that include the second amplifying waveguide 2, or the arrangements with direct diode pumping of the first amplifying waveguide 1. Preferably, the laser 121 uses the apparatus shown in FIGS. 10 and 11. The scanner 123 directs the optical radiation 15 to a work piece 124. An optional controller 125 is shown for synchronizing the laser 121 with the scanner 123. Synchronization can be achieved by direct diode modulation, modulation of the seed source in a MOPA configuration, or by Q-switching. The controller 125 may be computer controlled. The apparatus is useful for materials processing applications with short (10 to 50 ns) high-energy (0.1 mJ to 1 mJ) pulses at eye safe wavelengths, and with the low thermal heat generation advantages that can be achieved with in-band pumping.

It is to be appreciated that the embodiments of the invention described above with reference to the accompanying drawings have been given by way of example only and that modifications and additional components may be provided to enhance performance.

The present invention extends to the above-mentioned features taken in isolation or in any combination.

The invention claimed is:

1. Apparatus for providing optical radiation comprising:
a pump source and at least one first amplifying waveguide, wherein
the pump source comprises a plurality of laser diodes and least one second amplifying waveguide;
the plurality of laser diodes are configured to pump the second amplifying waveguide to provide pump radiation;
the apparatus being such that the first amplifying waveguide emits the optical radiation when pumped by the pump radiation;
and wherein
the first amplifying waveguide comprises a first optical fibre;
the first optical fibre is a multi-mode optical fibre and comprises a region comprising a first rare-earth dopant; and wherein:
the second amplifying waveguide comprises a second optical fibre;
the second optical fibre comprises a region comprising a second rare-earth dopant; and
the pump radiation is defined by a wavelength,
the apparatus further comprising a means to change the wavelength of the pump radiation emitted by the second amplifying waveguide between a first wavelength and a second wavelength, wherein the first rare-earth dopant is selected to absorb the pump radiation more strongly at the first wavelength than the second wavelength, and wherein the optical radiation emitted by the first waveguide has a higher brightness when the second waveguide emits the pump radiation at the first wavelength than when the second waveguide emits the pump radiation at the second wavelength, thereby providing a means to modulate the optical radiation emitted by the apparatus from on to substantially off.

2. Apparatus according to claim 1, wherein:
the apparatus is in the form of a master oscillator power amplifier; and
the means to change the wavelength of the pump radiation emitted by the second amplifying waveguide comprises a source of optical radiation.

3. Apparatus according to claim 1, wherein:
the dopant in the second waveguide is selected such that the second waveguide can emit at the first and second wavelengths; and
the dopant in the first waveguide is selected such that the absorption at the first wavelength is substantially greater than the absorption at the second wavelength.

4. Apparatus according to claim 1 wherein:
the pump source includes a plurality of laser diodes and at least one second amplifying waveguide;
the first amplifying waveguide is pumped by the second amplifying waveguide, and the second amplifying waveguide is pumped by the laser diodes; and
the second amplifying waveguide is configured to improve the beam quality of radiation emitted by the laser diodes.

5. Apparatus according to claim 4 wherein the pump source includes at least one multimode beam combiner for combining optical radiation emitted by the laser diodes.

6. Apparatus according to claim 4 further comprising at least one first beam combiner configured to combine the pump radiation.

7. Apparatus according to claim 4 wherein the means to change the wavelength of the pump radiation emitted by the second amplifying waveguide comprises a wavelength tuneable reflector.

8. Apparatus according to claim 4 wherein the means to change the wavelength of the pump radiation emitted by the second amplifying waveguide comprises an optical switch.

9. Apparatus according to claim 4 wherein the means to change the wavelength of the pump radiation emitted by the second amplifying waveguide comprises a tuneable grating.

10. Apparatus according to claim 9 wherein the tuneable grating is one of thermally tuned or tuned by an actuator.

11. Apparatus according to claim 1 wherein the first rare earth dopant is selected from the group consisting of erbium, holmium and thulium.

12. Apparatus according to claim 11 wherein the first rare earth dopant is co-doped with ytterbium.

13. Apparatus according to claim 1 wherein the first rare-earth dopant is pumped substantially at the peak of its absorption band.

14. Apparatus according to claim 1 wherein the first optical fibre comprises a core and a cladding.

15. Apparatus according to claim 1 wherein the first optical fibre comprises a plurality of cores.

16. Apparatus according to claim 1 wherein the second optical fibre comprises a core and a cladding.

17. Apparatus according to claim 16 further comprising a grating written into at least one of the core and the cladding.

18. Apparatus according to claim 1 wherein the second optical fibre is single mode.

19. Apparatus according to claim 1 wherein the second optical fibre is multi mode.

20. Apparatus according to claim 1 wherein the second optical fibre comprises a plurality of cores.

21. Apparatus according to claim 1 wherein the means to change the wavelength of the pump radiation emitted by the second amplifying waveguide is a source of optical radiation.

22. Apparatus according to claim 1 wherein the pump source supplies the pump radiation for in-band pumping the first amplifying waveguide.

23. Apparatus according to claim 22 wherein both the wavelength of the pump radiation and the wavelength of the optical radiation are between 1400 nm and 2500 nm.

24. Apparatus according to claim 1 wherein the pump source comprises a broad stripe laser diode.

25. Apparatus according to claim 1 wherein the optical radiation is coupled to a scanner.

26. Apparatus according to claim 25 further comprising a controller configured to synchronize the optical radiation with the scanner.

27. Apparatus according to claim 1, wherein the apparatus is in the form of an amplifier, a laser, a master oscillator power amplifier, a Q-switched laser, a source of amplified spontaneous emission, or a continuous wave laser.

28. Apparatus according to claim 1 wherein the apparatus is in the form of a laser for material processing.

* * * * *